United States Patent
Hwang et al.

(10) Patent No.: US 8,136,620 B2
(45) Date of Patent: Mar. 20, 2012

(54) PASSENGER DISTINGUISHING APPARATUS HAVING WEIGHT DETECTION SENSOR AND DAMPER

(75) Inventors: Jae-Ho Hwang, Seongnam-si (KR); Byung-Hyuk Park, Yongin-si (KR); Byung-Yeol Kim, Yongin-si (KR)

(73) Assignee: HYUNDAI MOBIS Co., Ltd, Yongin-si, Gyeonggi-do (KR)

( * ) Notice: Subject to any disclaimer, the term of this patent is extended or adjusted under 35 U.S.C. 154(b) by 295 days.

(21) Appl. No.: 12/534,041

(22) Filed: Jul. 31, 2009

(65) Prior Publication Data

US 2010/0038940 A1    Feb. 18, 2010

(30) Foreign Application Priority Data

Aug. 18, 2008  (KR) .................... 10-2008-0080598

(51) Int. Cl.
*B60R 21/015* (2006.01)

(52) U.S. Cl. ........ 180/273; 280/735; 177/136; 177/144; 177/DIG. 9; 73/862.631; 73/862.634; 73/761; 296/63; 297/217.2

(58) Field of Classification Search .............. 177/136, 177/144, DIG. 9; 180/273; 280/735; 73/862.631, 73/862.634, 761; 296/63, 65.01, 65.02; 297/217.2
See application file for complete search history.

(56) References Cited

U.S. PATENT DOCUMENTS

| | | | | |
|---|---|---|---|---|
| 4,899,840 A * | 2/1990 | Boubille | ................ | 177/139 |
| 5,600,104 A * | 2/1997 | McCauley et al. | ............ | 177/136 |
| 5,859,390 A * | 1/1999 | Stafford et al. | ................ | 177/144 |
| 5,991,676 A * | 11/1999 | Podoloff et al. | ................ | 701/45 |
| 6,150,619 A * | 11/2000 | Borngasser | .................... | 177/201 |
| 6,412,357 B2 * | 7/2002 | Billen | ...................... | 73/862.637 |
| 6,555,765 B2 * | 4/2003 | Paine | ............................ | 177/142 |
| 6,571,647 B1 * | 6/2003 | Aoki et al. | ................ | 73/862.381 |
| 6,677,539 B2 * | 1/2004 | Miura et al. | ................ | 177/136 |
| 6,748,814 B2 * | 6/2004 | Ishida et al. | ............. | 73/862.391 |
| 6,797,892 B2 * | 9/2004 | Golla | ...................... | 73/862.637 |
| 6,865,961 B2 * | 3/2005 | Wolf et al. | ................. | 73/862.69 |
| 6,916,997 B2 * | 7/2005 | Thakur et al. | ................. | 177/136 |
| 6,933,451 B2 * | 8/2005 | Sakamoto et al. | ............ | 177/144 |
| 6,969,809 B2 * | 11/2005 | Rainey | .......................... | 177/136 |
| 7,038,146 B2 * | 5/2006 | Saito et al. | .................... | 177/136 |
| 7,112,749 B2 * | 9/2006 | DiPaola et al. | ................ | 177/136 |
| 7,297,880 B2 * | 11/2007 | Sulkowski et al. | ........... | 177/144 |
| 7,328,627 B2 * | 2/2008 | Kawabata et al. | ........ | 73/862.627 |
| 7,373,846 B2 * | 5/2008 | Furukawa et al. | ........ | 73/862.621 |
| 7,435,918 B2 * | 10/2008 | Becker et al. | ................ | 177/136 |
| 7,455,343 B2 * | 11/2008 | Endo et al. | ................... | 296/68.1 |
| 7,513,571 B2 * | 4/2009 | Hofmann et al. | ........ | 297/344.15 |
| 7,836,997 B2 * | 11/2010 | Takayasu et al. | ............ | 180/273 |
| 2005/0061643 A1 | 3/2005 | Rainey | | |
| 2006/0010984 A1 * | 1/2006 | Yamazaki | ......................... | 73/761 |
| 2006/0048582 A1 * | 3/2006 | Furukawa et al. | ............. | 73/856 |
| 2009/0051198 A1 * | 2/2009 | Ishikawa et al. | ........... | 297/217.2 |
| 2009/0157256 A1 * | 6/2009 | Hwang et al. | .................. | 701/36 |
| 2010/0038150 A1 * | 2/2010 | Hwang et al. | ................. | 177/136 |

* cited by examiner

*Primary Examiner* — Randy W Gibson

(74) *Attorney, Agent, or Firm* — Sherr & Vaughn, PLLC

(57) ABSTRACT

A passenger distinguishing apparatus is provided. The passenger distinguishing apparatus includes: a weight detection sensor that is assembled in a vehicle seat to detect a passenger's weight; and a first bracket and a second bracket that assemble the weight detection sensor in the seat, wherein the weight detection sensor has a length direction in a horizontal direction of the seat, and a first damper for absorbing assembling tolerance of the weight detection sensor is disposed between the first bracket and the weight detection sensor. Therefore, assembling tolerance can be absorbed with minimum parts, production can be improved, contact noise can be reduced, and a weight and cost can be reduced.

16 Claims, 4 Drawing Sheets

US 8,136,620 B2

PASSENGER DISTINGUISHING APPARATUS HAVING WEIGHT DETECTION SENSOR AND DAMPER

CROSS REFERENCE TO PRIOR APPLICATION

The present application claims priority under 35 U.S.C. 119 and 35 U.S.C. 365 to Korean Patent Application No. 10-2008-0080598 (filed on Aug. 18, 2008), which is hereby incorporated by reference in its entirety.

BACKGROUND OF THE INVENTION

1. Field of the Invention

The present invention relates to a passenger distinguishing apparatus, and more particularly, to a passenger distinguishing apparatus that has a weight detection sensor assembled in a horizontal direction of a vehicle seat and a damper for absorbing assembling tolerance of the weight detection sensor.

2. Description of the Related Art

An air bag device is a device for protecting passengers within vehicles by absorbing a physical impact occurring when vehicles collide using elasticity of an air cushion and is classified into a driver seat air bag device, a passenger seat air bag device, a side air bag device, and a curtain air bag device.

When a gas is injected into the air cushion upon collision of vehicles, the air cushion is inflated in a high speed in order to protect a passenger, and thus when the passenger seated in a passenger seat is a child or an adult having a relatively light weight, due to an impact by inflation of the air cushion, the passenger may be injured.

In order to prevent this, a plurality of weight detection sensors for detecting the passenger's weight are disposed at the passenger seat, the plurality of weight detection sensors detect the passenger's weight and determine whether a passenger is seated in the passenger seat and whether the seated passenger is a child, an adult having a light weight, or an adult having a general weight, and determine inflation of the air bag and change an inflation condition of the air bag according to a condition of the passenger seated in the passenger seat.

The weight detection sensor is classified into a vertical mounting type assembled in a vertical direction of the seat and a horizontal mounting type assembled in a horizontal direction of the seat.

Unlike the vertical mounting type, because the horizontal mounting type uses a basic assembling structure of the seat without necessity to provide a separate bracket for assembling in the seat, a weight and cost can be reduced, however the horizontal mounting type may be rotated by assembling tolerance between the weight detection sensor and the weight detection sensor and a hole for assembling the weight detection sensor and the weight detection sensor. Further, similarly to the vertical mounting type, in the horizontal mounting type, assembling tolerance occurred in the seat becomes a factor for causing error when detecting a weight of the passenger seated in the seat. That is, even if minute assembling tolerance occurs when assembling the seat, when the weight detection sensor detects a weight, considerable error may occur, and because the horizontal mounting type rotates by the passenger's weight, the horizontal mounting type cannot accurately detect the passenger's weight, and thus has a negative influence on inflation of the air bag and an inflation condition of the air bag.

SUMMARY OF THE INVENTION

The present invention has been made in an effort to solve the above problems, and the present invention provides a passenger distinguishing apparatus that can reduce a weight and cost while improving production and reducing contact noise by absorbing assembling tolerance with minimum parts as a weight detection sensor is assembled in a horizontal direction of a vehicle seat and a damper for absorbing an assembling tolerance of the weight detection sensor is disposed.

According to an aspect of the present invention, there is provided a passenger distinguishing apparatus including: a weight detection sensor that is assembled in a vehicle seat to detect a passenger's weight; and a first bracket and a second bracket that assemble the weight detection sensor in the seat, wherein the weight detection sensor has a length direction in a horizontal direction of the seat, and a first damper for absorbing assembling tolerance of the weight detection sensor is disposed between the first bracket and the weight detection sensor.

The passenger distinguishing apparatus may further include a first sleeve that is disposed between the weight detection sensor and the first damper to prevent shaking of the first damper.

In the first damper, a forming part having an increasing diameter as an outer circumferential surface contacting with the first bracket separates from the first bracket may be formed, and the first bracket may have a bending part in which a portion contacting with the forming part is bent in a shape corresponding to the forming part.

The passenger distinguishing apparatus may further include a second damper that is disposed between the second bracket and the weight detection sensor to absorb assembling tolerance of the weight detection sensor.

The passenger distinguishing apparatus may further include a second sleeve that is disposed between the weight detection sensor and the second damper to prevent shaking of the second damper.

BRIEF DESCRIPTION OF THE DRAWINGS

The objects, features and advantages of the present invention will be more apparent from the following detailed description in conjunction with the accompanying drawings, in which.

DESCRIPTION OF THE PREFERRED EMBODIMENT

Hereinafter, exemplary embodiments according to the present invention will be described in detail with reference to the accompanying drawings.

Figure 1:
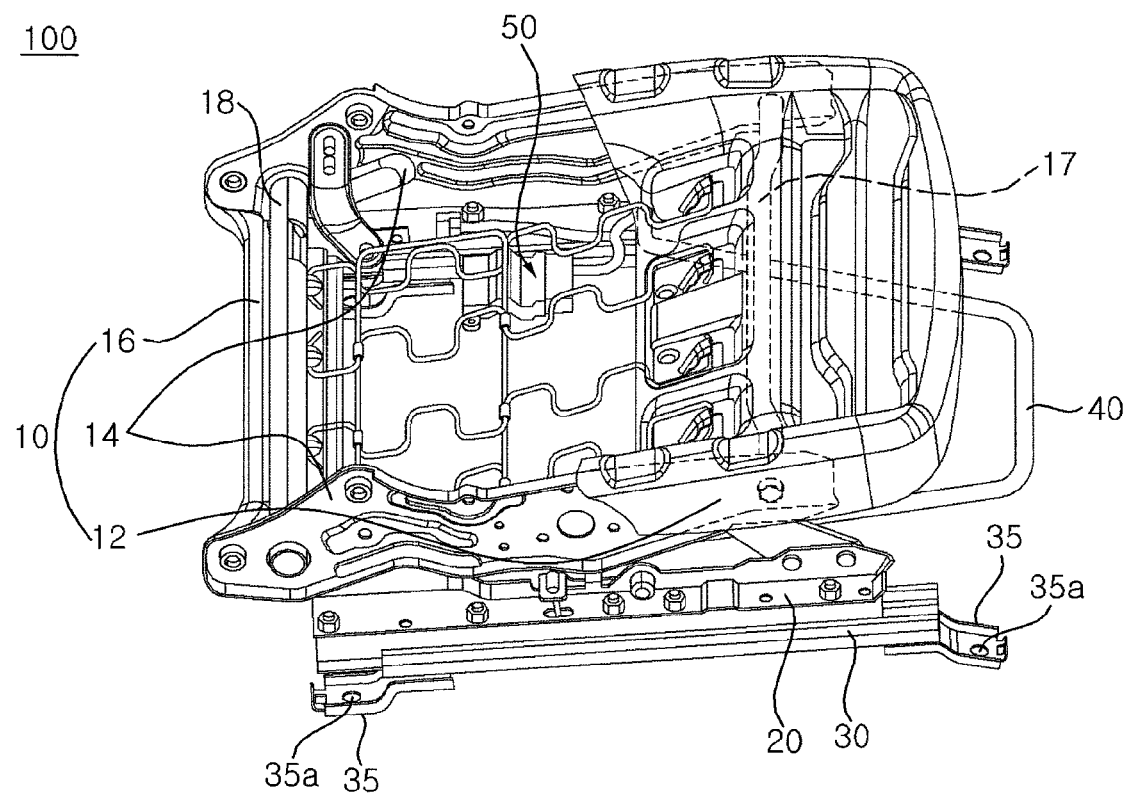
FIG. 1 is a view illustrating a vehicle seat including a passenger distinguishing apparatus according to an exemplary embodiment of the present invention.

FIG. 1 is a view illustrating a vehicle seat including a passenger distinguishing apparatus according to an exemplary embodiment of the present invention.

Referring to FIG. 1, a vehicle seat 100 including the passenger distinguishing apparatus includes a seat frame 10 in which a seat cover is mounted, a sliding bracket 20 that is connected to the downside of the seat frame 10, and a guide bracket 30 that is coupled to slide the sliding bracket 20 in the front-rear direction of a vehicle to guide the sliding bracket 20.

The seat frame 10 includes a front frame 12 that is bent from a front surface of the seat frame 10 toward the rear side to be formed in a part of a side surface thereof, a side frame 14 that is connected to both sides of the front frame 12 to form the remaining portion of the side surface of the seat frame 10, and a rear frame 16 that is connected to the side frame 14 in a width direction of the vehicle to form the rear side of the seat frame 10. In the part of the side surface of the front frame 12 and the side frame 14, reinforcement frames 17 and 18, respectively are disposed in a width direction of the vehicle.

The sliding bracket 20 and the guide bracket 30 are separated by a predetermined distance in a width direction of the vehicle in order to support both sides of the seat frame 10 and are disposed at the left side and the right side, respectively of the seat 100.

A fixing bracket 35 is connected to both ends of the guide bracket 30, and the guide bracket 30 is fixed to the floor of a vehicle room by inserting a fastening member (not shown) into a fastening hole 35a formed in the fixing bracket 35.

Both ends of a seat position adjustment member 40 are coupled to the sliding bracket 20 so that the seat position adjustment member 40 may rotate in a vertical direction, and the seat position adjustment member 40 is protruded to the front side of the seat 100. When the seat position adjustment member 40 rotates in an upper direction by pulling, the sliding bracket 20 slides relative to the guide bracket 30, and as a passenger moves the seat 100 in the front-rear direction of the vehicle, the seat 100 is adjusted to correspond to his body condition.

In an inner side surface of the sliding bracket 20, a passenger distinguishing apparatus 50 for determining whether a passenger is seated in the seat 100, and whether the seated passenger is a child, an adult having a light weight, or an adult having a general weight, by detecting a weight of the passenger seated in the seat 100, is disposed. This is described in detail with reference to FIG. 2.

Figure 2:
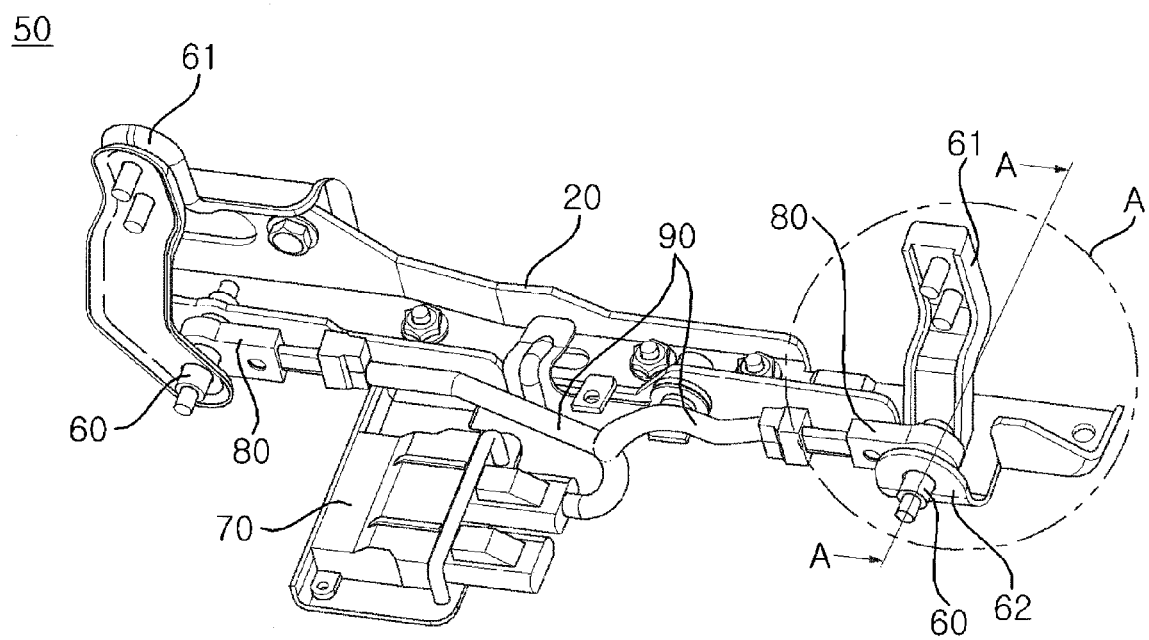
FIG. 2 is a detail view of the passenger distinguishing apparatus shown in FIG. 1.

FIG. 2 is a detail view of the passenger distinguishing apparatus shown in FIG. 1.

Referring to FIGS. 1 and 2, the passenger distinguishing apparatus 50 according to the present invention includes a weight detection sensor 60 that is assembled in the sliding bracket 20 of the vehicle seat 100 to detect a passenger's weight and a weight classification unit 70 (WCU) that receives the passenger's weight detected in the weight detection sensor 60 to transfer the passenger's weight to an air-bag control unit (ACU) (not shown).

Total four weight detection sensors 60 are disposed at each of the front and rear sides of the sliding bracket 20.

One end of the weight detection sensor 60 is assembled to a first bracket 61 connected to the side frame 14 of the seat frame 10, and the other end thereof is assembled in a second bracket 62 disposed at the sliding bracket 20.

The weight detection sensors 60 are assembled in the first bracket 61 and the second bracket 62 so that a length direction of the weight detection sensor 60 may be a horizontal direction of the seat 100.

Further, the weight detection sensor 60 detects a weight of a passenger seated in the seat 100 and transfers the detected weight to the WCU 70 through a connector 80 and a wire 90.

The WCU 70 receives the passenger's weight from the weight detection sensor 60 to classify the kind of the passenger and transfers a weight signal to the ACU. According to the kind and weight of the passenger transferred from the WCU 70, the ACU determines whether a passenger is seated in the seat 100 and whether the seated passenger is a child, an adult having a light weight, or an adult having a general weight, determines inflation of the air bag, and changes an inflation condition of the air bag.

Figure 3:
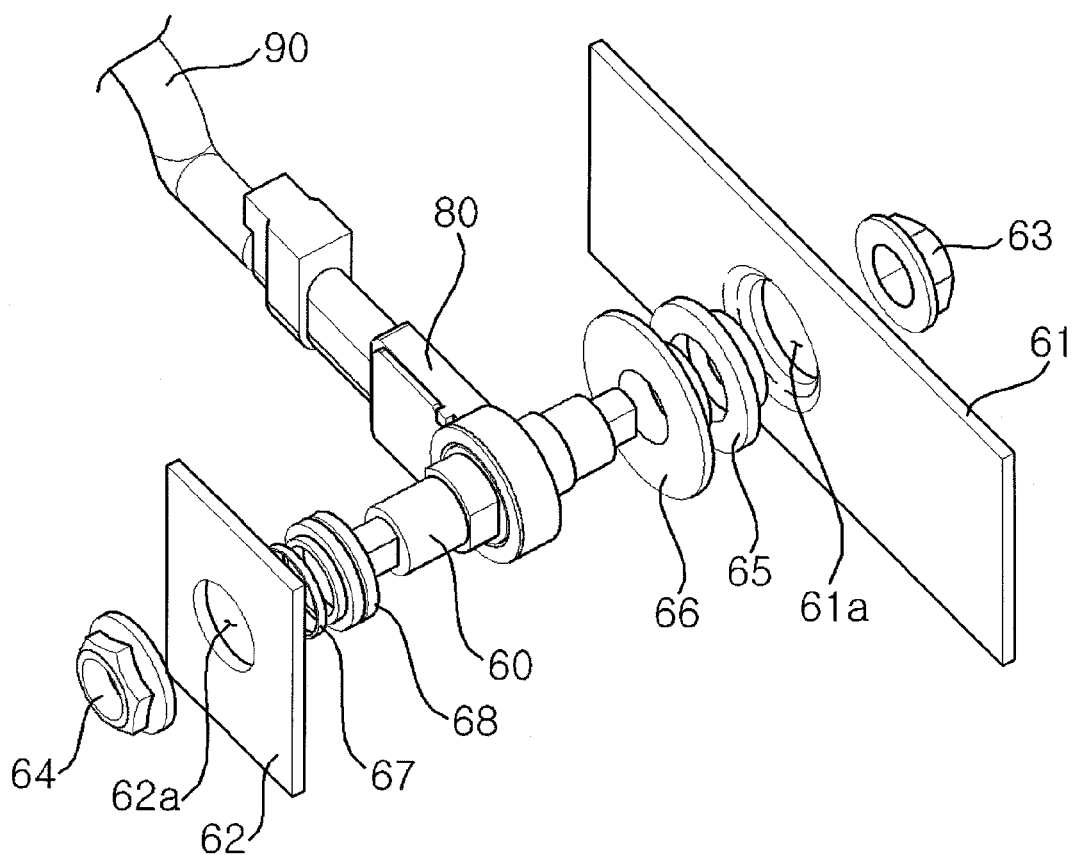
FIG. 3 is an exploded perspective view of a portion 'A' partitioned with a dotted line in FIG. 2.
Figure 4:
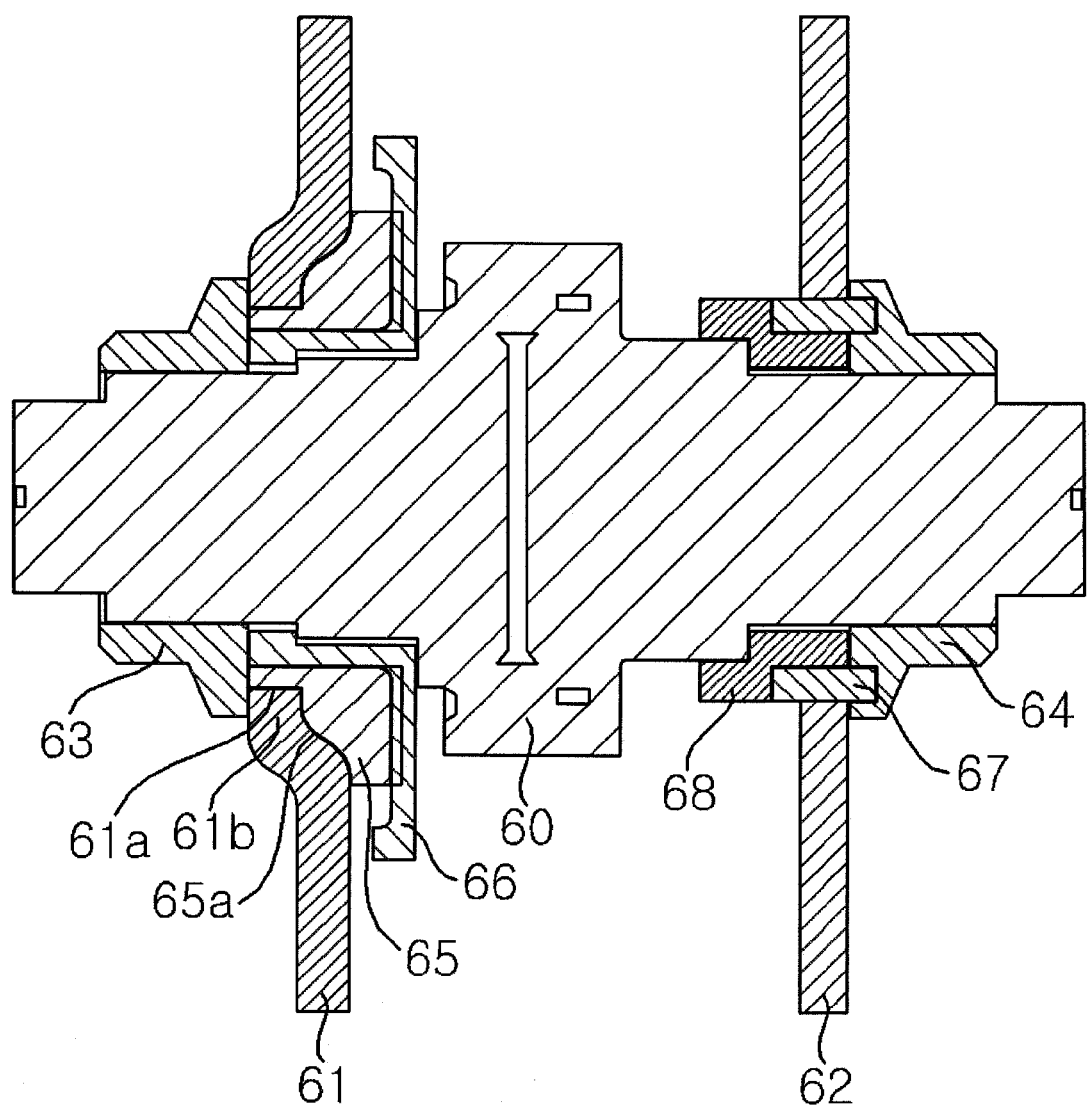
FIG. 4 is a cross-sectional view taken along line A-A of FIG. 2.

FIG. 3 is an exploded perspective view of a portion 'A' partitioned with a dotted line in FIG. 2, and FIG. 4 is a cross-sectional view taken along line A-A of FIG. 2.

Referring to FIGS. 3 and 4, the connector 80 is disposed at an outer circumferential surface of the weight detection sensor 60, the connector 80 is connected to the wire 90, and the wire 90 is connected to the WCU 70 shown in FIG. 2. One end of the weight detection sensor 60 is assembled in the first bracket 61 through a cam member 63, and the other end thereof is assembled in the second bracket 62 through a cam member 64.

Specifically, the first bracket 61 and the second bracket 62 have assembling holes 61a and 62a, respectively through which both ends of the weight detection sensor 60 penetrate, and both ends of the weight detection sensor 60 are assembled in the first bracket 61 and the second bracket 62 through the cam members 63 and 64 after penetrating through the assembling holes 61a and 62a, respectively.

Both ends of the weight detection sensor 60 may be formed in a male screw, and the cam members 63 and 64 may be a nut in which a female screw fastened to the male screw is formed.

The weight detection sensor 60 is assembled so that a length direction thereof may be a horizontal direction of the seat 100, and a first damper 65 for absorbing assembling tolerance of the weight detection sensor 60 is disposed between the first bracket 61 and the weight detection sensor 60.

The first damper 65 is made of a material having predetermined elasticity, and when the weight detection sensor 60 is assembled in the first bracket 61, the first damper 65 absorbs assembling tolerance by sealing a gap between the weight detection sensor 60 and the first bracket 61 and thus prevents the weight detection sensor 60 from rotating by the passenger's weight, thereby minimizing detection error of the passenger's weight by the weight detection sensor 60.

As described above, as the weight detection sensor 60 included in the passenger distinguishing apparatus 50 is assembled so that a length direction thereof may be a horizontal direction of the seat 100, a basic assembling structure of the seat 100 can be used without necessity to prepare a separate bracket, compared to a weight detection sensor assembled in a vertical direction of the seat 100, and thus a weight and cost can be reduced. As the first damper 65 for absorbing assembling tolerance of the weight detection sensor 60 is disposed between the weight detection sensor 60 and the first bracket 61, the first damper 65 absorbs tolerance occurred in the seat 100 and prevents the weight detection sensor 60 from rotating by the passenger's weight, thereby minimizing detection error of the passenger's weight, similarly to the weight detection sensor 60 assembled in a vertical direction of the seat 100.

Referring to FIG. 4, a forming part 65a having an increasing diameter as an outer circumferential surface thereof contacting with the first bracket 61 is separated from the first bracket 61 is formed in the first damper 65, and a bent part 61b in which a portion contacting with the forming part 65a is bent in a shape corresponding to the forming part 65a is formed in the first bracket 61. The forming part 65a and the bent part 61b absorb assembling tolerance of the weight detection sensor 60 to the maximum by increasing a contact area between the first damper 65 and the first bracket 61.

Referring to FIGS. 3 and 4, a first sleeve 66 is disposed between the weight detection sensor 60 and the first damper 65. When assembling one end of the weight detection sensor 60 in the first bracket 61, the first sleeve 66 prevents shaking of the first damper 65, thereby minimizing assembling tolerance of the weight detection sensor 60.

A second damper 67 is disposed between the second bracket 62 and the weight detection sensor 60. Because the second damper 67 is formed with the same material and shape as those of the first damper 65, when assembling the other end of the weight detection sensor 60 in the second bracket 62, the second damper 67 is disposed between the other end of the weight detection sensor 60 and the second bracket 62 to absorb assembling tolerance of the weight detection sensor 60. In the present exemplary embodiment, the second damper 67 is inserted into the assembling hole 62a of the second bracket 62 and both sides thereof are a rubber member to closely contact with the cam member 64 and a second sleeve 68 to be described later.

The second sleeve 68 is disposed between the weight detection sensor 60 and the second damper 67. When the other end of the weight detection sensor 60 assembles in the second bracket 62, the second sleeve 68 prevents shaking of the second damper 67, thereby minimizing assembling tolerance of the weight detection sensor 60, and the second sleeve 68 prevents contact noise that may be occurred in tolerance between the assembling hole 62a and the weight detection sensor 60.

In a passenger distinguishing apparatus according to the present invention, as a weight detection sensor is assembled in a horizontal direction of a vehicle seat and a damper for absorbing assembling tolerance of the weight detection sensor is disposed, assembling tolerance can be absorbed with minimum parts, production can be improved, contact noise can be reduced, and a weight and cost can be reduced.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A passenger distinguishing apparatus comprising:
a weight detection sensor disposed at a vehicle seat to detect a passenger's weight, the weight detection sensor having a length dimension which is the longest dimension of the weight detection sensor;
a first bracket and a second bracket that retain the weight detection sensor at the seat, wherein the first bracket is fixed to a seat frame and the second bracket is fixed to a sliding bracket;
a first damper disposed between the first bracket and the second bracket for absorbing assembly tolerance of the weight detection sensor; and
a first sleeve disposed between the weight detection sensor and the first damper to prevent shaking of the first damper,
wherein the weight detection sensor is disposed such that the length dimension of the weight detection sensor is parallel to a horizontal direction of the vehicle seat.

2. The passenger distinguishing apparatus of claim 1, wherein the first damper is disposed between the first bracket and the weight detection sensor.

3. The passenger distinguishing apparatus of claim 1, wherein:
the first damper has an articulated portion; and
a diameter of an outer circumferential surface contacting with the first bracket increases along the length dimension.

4. The passenger distinguishing apparatus of claim 3, wherein the first bracket has a bending portion of which a portion contacting with the articulated portion of the damper conforms to the shape of the articulated portion of the damper.

5. The passenger distinguishing apparatus of claim 1, further comprising a second damper that is disposed between the second bracket and the weight detection sensor to absorb assembly tolerance of the weight detection sensor and to prevent contact noise.

6. The passenger distinguishing apparatus of claim 5, further comprising a second sleeve that is disposed between the weight detection sensor and the second damper to prevent shaking of the second damper.

7. The passenger distinguishing apparatus of claim 1, further comprising:
cam elements which fix the weight detection sensor to the first and second brackets.

8. The passenger distinguishing apparatus of claim 7, wherein the cam elements are nuts which are threaded with both ends of the weight detection sensor.

9. A passenger distinguishing apparatus comprising:
a weight detection sensor disposed at a vehicle seat to detect a passenger's weight, the weight detection sensor having a length dimension which is the longest dimension of the weight detection sensor, wherein the weight detection sensor is disposed such that the length dimension of the weight detection sensor is parallel to a horizontal direction of the vehicle seat;
a first bracket and a second bracket that retain the weight detection sensor at the seat, wherein the first bracket is fixed to a seat frame and the second bracket is fixed to a sliding bracket; and
a first damper disposed between the first bracket and the second bracket for absorbing assembly tolerance of the weight detection sensor,
wherein the first damper is made of rubber.

10. A passenger distinguishing apparatus for a vehicle seat of a vehicle having an air bag controlled by an air-bag control unit, the passenger distinguishing apparatus comprising:
a weight detection sensor extending in parallel to the width of the vehicle seat for detecting a weight of a passenger seated in the vehicle seat;
a first bracket connected to the vehicle seat and adapted to support a first end of the weight detection sensor;
a second bracket spaced from the first bracket and connected to the vehicle seat, the second bracket adapted to support a second end of the weight detection sensor;
a weight classification unit connected to the weight detection sensor for receiving an electric signal corresponding to the detected weight of the passenger and transferring the electric signal to the air-bag control unit;
a first damper disposed between the first bracket and the weight detection sensor for absorbing a first assembling tolerance of the weight detection sensor at the first end of the weight detection sensor;
a second damper disposed between the second bracket and the weight detection sensor for absorbing a second assembling tolerance of the weight detection sensor at a second end of the weight detection sensor;
a first sleeve concentrically received by the first end of the weight detection sensor and disposed between the weight detection sensor and the first damper; and
a second sleeve concentrically received by the second end of the weight detection sensor and disposed between the weight detection sensor and the second damper.

11. The seat of claim 10, wherein the first damper absorbs the first assembling tolerance by sealing a gap between the first end of the weight detection sensor and the first bracket to thereby prevent the weight detection sensor from rotating due to the weight of the passenger.

12. The seat of claim 10, wherein the second damper absorbs the second assembling tolerance by sealing a gap between the second end of the weight detection sensor and the second bracket to thereby prevent the weight detection sensor from rotating due to the weight of the passenger.

13. The seat of claim 10, wherein the electric signal is transferred to the weight classification unit through a connector disposed at an outer circumferential surface of the weight detection sensor and a wire connected to the connector.

14. A seat comprising:
   a seat frame having a front seat frame, a rear seat frame and side seat frames extending between and connected respectively to the front seat frame and the rear seat frame;
   a guide bracket for supporting the seat frame;
   a slide bracket provided at the guide bracket and movable between forward and rearward directions relative thereto;
   a passenger distinguishing apparatus provided at front and rear ends of the sliding bracket, the passenger distinguishing apparatus having a weight detection sensor which detects a weight of a person seated in the seat and a weight classification unit connected to the weight detection sensor that receives an electric signal corresponding to the detected weight of the person, wherein the weight detection sensor is provided such that it extends in parallel to the width of the seat;
   dampers for absorbing assembling tolerance of the weight detection sensor;
   a first sleeve disposed between the weight detection sensor and a first one of the dampers; and
   a second sleeve disposed between the weight detection sensor and a second one of the dampers.

15. The seat of claim 14, wherein further comprising:
   a first sensor bracket connected to each side seat frame for receiving a first end of the weight detection sensor; and
   a second sensor bracket connected to the sliding bracket for receiving a second end of the weight detection sensor.

16. The seat of claim 15, wherein the dampers absorb assembling tolerance when the weight detection sensor is assembled in the first sensor bracket and the second bracket by sealing a gap between the first end of the weight detection sensor and the first sensor bracket and the second end of the weight detection sensor and the second sensor bracket to thereby prevent the weight detection sensor from rotating due to the weight of the person.

* * * * *